(12) United States Patent
Heckmann

(10) Patent No.: US 6,799,778 B2
(45) Date of Patent: Oct. 5, 2004

(54) VEHICLE WITH FRAME SUPPORT

(75) Inventor: Horst Heckmann, Sprockhövel (DE)

(73) Assignee: Schwing GmbH, Herne (DE)

( * ) Notice: Subject to any disclaimer, the term of this patent is extended or adjusted under 35 U.S.C. 154(b) by 18 days.

(21) Appl. No.: 10/056,898

(22) Filed: Jan. 25, 2002

(65) Prior Publication Data

US 2002/0109344 A1 Aug. 15, 2002

Related U.S. Application Data

(63) Continuation of application No. 09/692,062, filed on Oct. 19, 2000, now abandoned, which is a continuation of application No. 09/141,124, filed on Aug. 27, 1998, now abandoned.

(30) Foreign Application Priority Data

Aug. 29, 1997 (DE) .......................................... 197 37 678

(51) Int. Cl.[7] .................................................. B60S 9/02
(52) U.S. Cl. ..................... 280/763.1; 212/301; 212/302; 280/766.1
(58) Field of Search ........................... 280/763.1, 765.1, 280/766.1; 212/301, 302, 303, 304, 305, 306

(56) References Cited

U.S. PATENT DOCUMENTS 3,716,252 A * 2/1973 Johnson
5,638,967 A 6/1997 Heckmann ................ 280/763.1

FOREIGN PATENT DOCUMENTS

| DE | 1756144 | * | 3/1970 | .............. 280/763.1 |
| DE | 27 33 994 | | 7/1977 | |
| DE | 43 44 779 | | 6/1995 | |
| JP | 5-178171 | * | 7/1993 | .............. 280/763.1 |

* cited by examiner

Primary Examiner—Eric Culbreth
(74) Attorney, Agent, or Firm—Kinney & Lange, P.A.

(57) ABSTRACT

In a vehicle with a superstructure having at least one swiveling mast on a slewing gear and a frame support with the aid of front and back movable telescopes disposed on each side of the long sides of the vehicle, their stationary telescopes being disposed at least partly in an arc tangentially to the longitudinal direction of the vehicle and extending in each case from one of the long sides of the vehicle profile inward substantially as far as the middle of the vehicle and then on to the same long side of the vehicle profile, it is provided according to the invention that the stationary telescopes of the front and back movable telescopes of each long side of the vehicle are realized with a common carrier and disposed one behind the other such that the movable telescopes emerge from the associated ends of the carriers.

9 Claims, 2 Drawing Sheets

VEHICLE WITH FRAME SUPPORT

CROSS REFERENCE TO RELATED APPLICATION(S)

Figure 1:
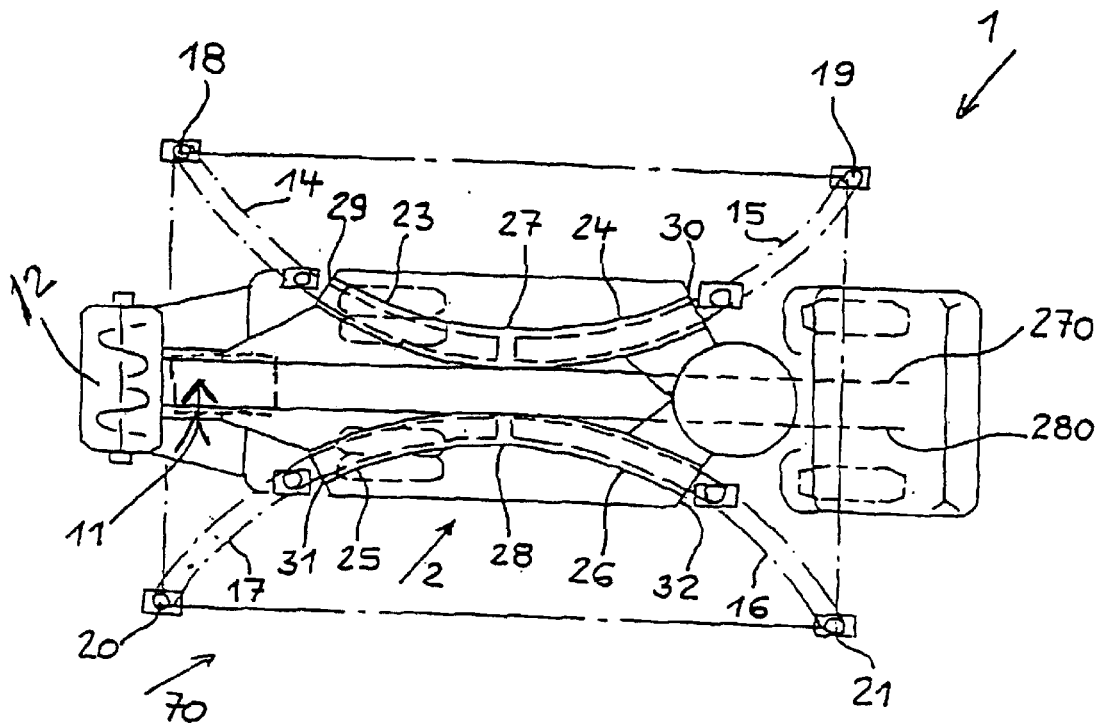

This is a continuation of application Ser. No. 09/692,062 filed Oct. 19, 2000, abandoned, which was a continuation of application Ser. No. 09/141,124, filed Aug. 27, 1998, abandoned.

This invention relates to a vehicle with a superstructure having at least one swiveling mast on a slewing sear and a frame support with the aid of front and back movable telescopes disposed on each side of the long side of the vehicle. Stationary telescopes are disposed at least partly in an arc tangentially to the longitudinal direction of the vehicle and extend in each case from one of the long sides of the vehicle profile inward substantially as far as the middle of the vehicle and then on to the same long side of the vehicle profile.

For such vehicles one uses, if possible, standard truck undercarriages whose chassis is only slightly modified or strengthened but is given a frame for the superstructure. The tilting moments arising through the overhang of the mast are removed by the frame support on the base of the vehicle. Since the mast swivels fully in both directions if the slewing gear rotates about an arc, one requires front and back frame supports for its utilization. This results in a two-point support on each side of the vehicle.

The tilting moments from the mast regularly make it necessary to provide the support outside the vehicle profile. This profile must be maintained for the driving mode. Although the tilting moments toward the front and/or back are less problematic about the transverse axis of the vehicle than about the longitudinal axis of the vehicle, tilting moments about the longitudinal vehicle axis are unavoidable in most cases. This results in outreaches of the frame support disposed outside the vehicle profile in the extended state even in vehicles of the above described simpler construction.

According to the invention the frame support is effected with the aid of jibs executed as movable telescopes so that they can be accommodated in the associated stationary telescopes within the vehicle profile in space-saving fashion for the journey and be extended to the required length for operating a concrete pump for example. According to the invention the stationary telescopes are disposed at least partly in an arc tangentially to the longitudinal direction of the vehicle and extend in each case from one of the long sides of the vehicle profile inward substantially as far as the middle of the vehicle and then on to the same long side of the vehicle profile. This permits the space within the vehicle profile to be fully utilized on both long sides of the vehicle, which has an advantageous effect on the span and length of the jibs.

Such vehicles are known in the art (DE 43 44 779 A1, corresponding to U.S. Pat. No. 5,638,967 issued Jun. 17, 1997 to Heckmann). The stationary telescopes of each side of the vehicle are executed here separately from each other in carriers and disposed on the vehicle frame either one above the other or concentrically to each other. This leads to a considerable space requirement on both sides of the vehicle and also to additional technical effort due to the separate fastening of each stationary telescope to the vehicle frame, one consequence being an increase in vehicle weight, which is already substantially exploited by the heavy superstructure.

The invention takes a different path.

The invention is based on coordinating the maximum spans with the available length of the vehicle, thereby permitting the span of the movable telescopes to be sufficiently large, while the length of the vehicle regularly enlarged by the superstructure permits them to be accommodated on both long sides of the vehicle within the vehicle profile in such a way that the movable telescopes are disposed one behind the other within a common plane. The invention thus makes it possible to accommodate the two movable telescopes associated with each long side of the vehicle within a common stationary carrier from which they emerge separately from each other at both ends of the carrier.

The invention permits the space requirement for accommodating the movable telescopes to be reduced to a carrier plane on each side of the vehicle. This furthermore saves considerable weight in the frame support, which has an advantageous effect on the total technical effort.

Preferably, the movable and the stationary telescopes are congruent in their common carrier. This means that the clear profile of the carrier corresponds to the outer cross sections of the movable telescopes, apart from the necessary clearance of motion. Depending on the design of the guide in the form of plain or roller bearings this results in carriers with a small space requirement.

According to a further advantageous embodiment of the invention, the carriers of the stationary telescope are congruent on both sides of the vehicle. This means that the space requirement for the stationary telescopes is the same on both sides of the vehicle, which furthermore simplifies the technical effort for the carriers since they match each other in their essential dimensions.

The stationary telescopes and thus the darners provided for their realization preferably extend in an arc shape, namely in curvatures whose radii are equal on each of the two sides of the vehicle. This permits the congruence of the carriers on both sides of the vehicle if they extend in an arc shape.

These embodiments of the invention are not necessary for its realization, however. The invention instead allows the telescope jibs to be disposed and designed in accordance with the requirements of the individual case. The movable telescopes of at least one, but preferably both, sides of the vehicle therefore have different curvatures and the carriers have a corresponding curvature for each telescope. Such a design of the frame support permits different spans on the front and back frame supports and thus a better adaptation of the frame support to the tilting moments dependent on the mast.

For this purpose, one of the two stationary telescopes has a curvature, and the other can be lined out, i.e. can extend in a straight line.

Figure 2:
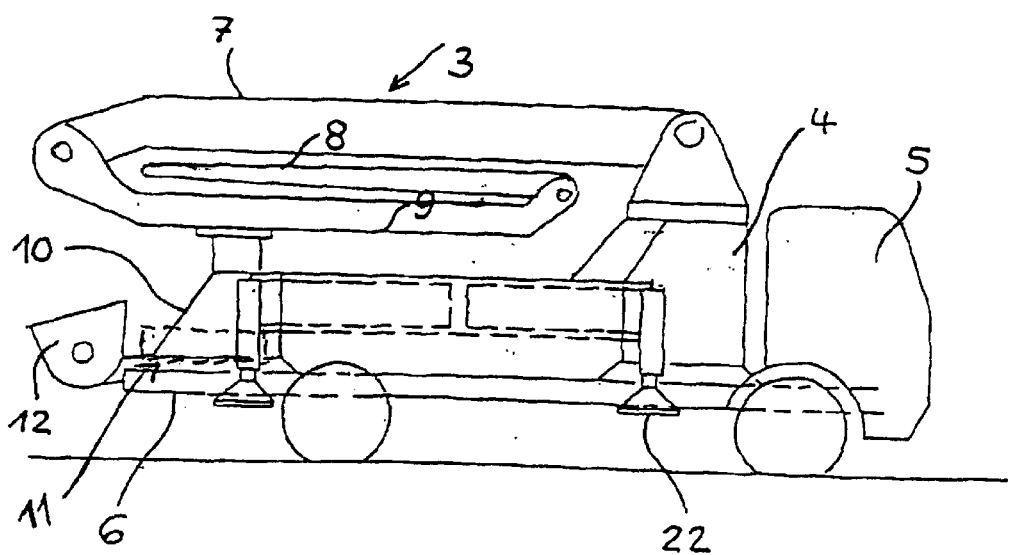
Figure 3:
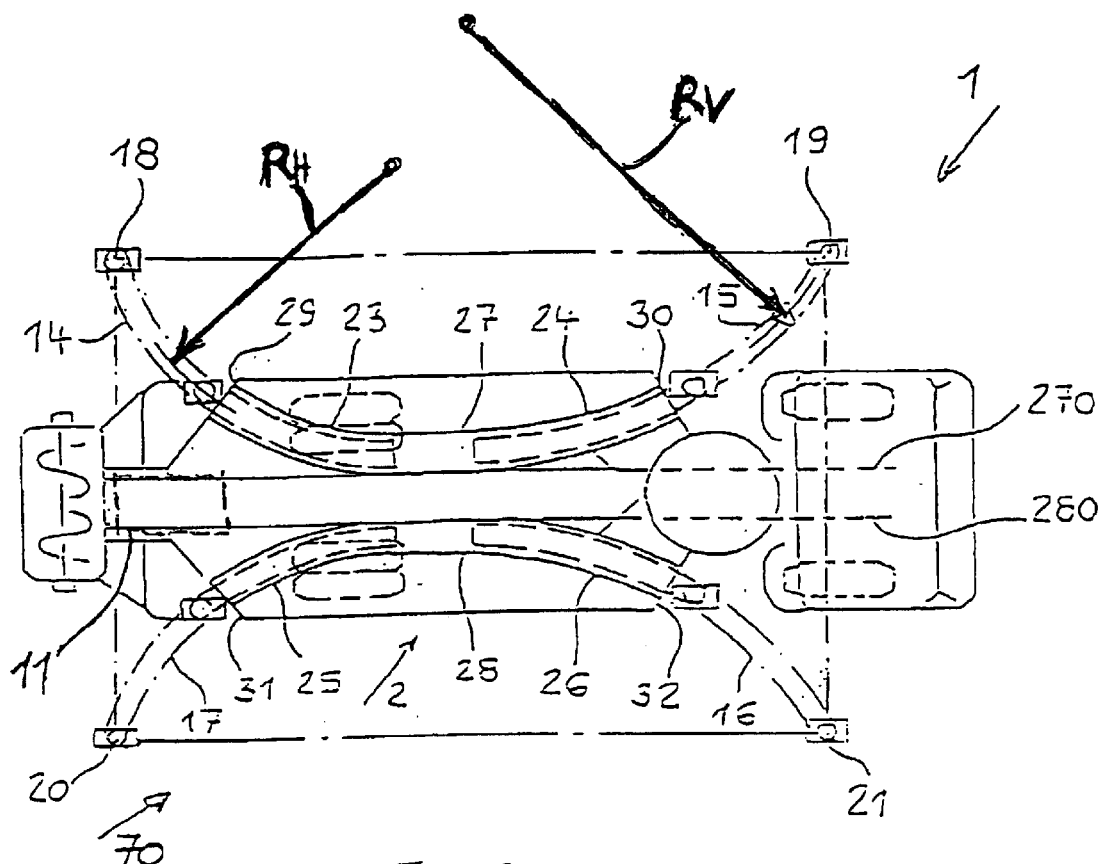

Details, further features and other advantages of the invention will result from the following description of an embodiment with reference to the figures in the drawing, in which FIG. 1 shows a vehicle in plan view with extended telescopes, and FIG. 2 shows the object of FIG. 1 with retracted telescopes in a schematic side view.

Vehicle 1 has superstructure 2 having swiveling mast 3 on slewing gear 4 behind cab 5 of truck undercarriage 6 and a frame support designated in general as 7 in FIG. 1. The mast is divided with the aid of operating joints into three sections 7, 8 and 9 and supported at 10 for the journey on an auxiliary frame not shown in detail. The superstructure furthermore includes concrete pump 11 (shown schematically) whose feeding hopper 12 is disposed behind mast support 10.

Frame support 70 is effected with the aid of jibs disposed on each side of the long side of the vehicle and executed as movable telescopes 14 to 17. At the free ends of each of these telescopes there is vertical support 18 to 21 which is in turn of telescopic design and carries baseplate 22 on its movable inside telescope.

The extended telescopes are shown by dash-dot lines in FIG. 1. Telescopes 15 and 16 form a front frame support, while telescopes 14 and 17 realize the back frame support, all telescopes being formed in an arc shape in this embodiment. Each telescope includes a stationary telescope. These parts of the frame support are designated as 23 to 26 in FIG. 1.

In the embodiment the stationary telescopes as well as the movable telescopes are executed in an arc shape. The arrangement is selected so that stationary telescopes 23 to 26 are disposed in an arc tangentially to the longitudinal direction of the vehicle and extend in each case from one of the long sides of the vehicle profile inward substantially as far as the middle of the vehicle and then on to the same long side of the vehicle profile. This is to be understood to mean that the two longitudinal members 270 and 280 usually forming the vehicle chassis are disposed between the apexes of the arcs of stationary telescopes 23, 24 and 26, 25.

Stationary telescopes 23, 24 and 25,26 of front and back movable telescopes 14, 15 and 17,16 of each long side of the vehicle are in communication with common carrier 27,28. The telescopes associated with each side of the vehicle are disposed one behind the other in these carriers and emerge from ends 29,30 and 31,32 of carriers 27,28 associated therewith. Consequently, fully retracted movable telescopes 14,15 and 16,17 do not exceed the vehicle profile in the horizontal so that no excess widths of the vehicle result in the driving mode. Furthermore, the space between chassis members 270 and 280 and the long side of the vehicle is utilized in the perpendicular only in the carrier plane, thereby ensuring economy of space.

In the embodiment the movable and stationary telescopes are congruent with their common carrier 27,28. For carriers 27 and 28 this results in an inside cross-section reduced to the necessary measure, i.e. equal to or less than the horizontal profile of the vehicle. Furthermore, carriers 27,28 of stationary telescopes 23 to 26 are congruent on both sides of the vehicle. This results in equal spans on both sides of the vehicle with the telescopes fully extended.

The arcs of stationary telescopes 23 to 26 are curved according to equal radii, and carriers 27 and 28 extends according to these equal radii of curvature. This results in a mirror-symmetric arrangement with respect to the center plane of the vehicle, which also has an advantageous effect on the weight counterbalance about the center axis of the vehicle since it improves the roadability.

Deviating from the shown embodiment, movable telescopes 14, 15 and 16; 17 can also have different curvatures on at least one side of the vehicle, which results in carriers 27, 28 having a different curvature for each of the telescopes. This makes it possible to select the spans of the front and back frame supports differently in accordance with the requirements of an individual case.

Likewise deviating from the shown embodiment, at least one of the two stationary telescopes 23 to 26 disposed in carrier 27,28 can be lined out, i.e. extended in a straight line. This permits the particular front or back frame support to be shifted further forward or backward on one or both sides in order to take better account of a given individual case.

Consequently, each of these embodiments permits extensive adaptation to the requirements of the individual case, while retaining the main advantage that little space is required on each side of the middle of the vehicle in the vehicle profile, i.e. clearance of the vehicle.

What is claimed is:

1. A vehicle for delivering concrete to an elevated location, the vehicle having opposing long sides, a front and a back, the vehicle comprising:
    a concrete pump having a feeding hopper;
    a superstructure with at least one swiveling extendable mast on a slewing gear; and
    a frame support for stabilizing the vehicle against tilting when the swiveling extendable mast is in an extended mast position, the frame support comprising:
        two pairs of movable telescoping members, each pair including a front and a back movable telescoping member, one of the pairs of movable telescoping members disposed on each of the long sides of the vehicle, wherein the movable telescoping members are for stabilizing the vehicle against tilting when the swiveling extendable mast is in an extended mast position; and
        a pair of common carriers, one of the common carriers disposed on each of the long sides of the vehicle, each common carrier disposed at least partly in an arc tangentially to a longitudinal direction of the vehicle and extending from one of the long sides of the vehicle inward substantially as far as a middle of the vehicle and outward to the same long side, each carrier cooperating with a pair of the movable telescoping members to allow each movable telescoping member to extend outward from the corresponding long side of the vehicle, wherein the common carrier disposes the front and back movable telescoping members one behind the other such that the movable telescoping members emerge from associated front and back ends of the common carrier.

2. The vehicle of claim 1, characterized in that the movable telescoping members are congruent with their common carriers.

3. The vehicle of claim 2, further comprising two stationary members associated with each common carrier and characterized in that the stationary members are congruent with their common carriers.

4. The vehicle of claim 3, characterized in that arcs of the stationary members have a common curvature according to one radius, and radii of curvature of both carriers on each of the two long sides of the vehicle are equal.

5. The vehicle of claim 2, characterized in that radii of curvature of both carriers on each of the long sides of the vehicle are equal.

6. The vehicle of claim 1, further comprising two stationary members associated with each common carrier and characterized in that the stationary members are congruent with their common carriers.

7. The vehicle of claim 6, characterized in that arcs of the stationary members have a common curvature according to one radius, and radii of curvature of both carriers on each of the two long sides of the vehicle are equal.

8. The vehicle of claim 1, characterized in that radii of curvature of the common carriers on each of the long sides of the vehicle are equal.

9. The vehicle of claim 1, characterized in that the movable telescoping members of at least one long side of the vehicle have different curvatures, and the common carriers have a corresponding curvature for each telescoping member.

* * * * *

UNITED STATES PATENT AND TRADEMARK OFFICE
CERTIFICATE OF CORRECTION

PATENT NO. : 6,799,778 B2  Page 1 of 1
APPLICATION NO. : 10/056898
DATED : October 5, 2004
INVENTOR(S) : Horst Heckmann It is certified that error appears in the above-identified patent and that said Letters Patent is hereby corrected as shown below:

Title Page, item 57 ABSTRACT
Line 4, delete "sides", insert -- side --

Title Page, item 57 after ABSTRACT, delete "9 Claims, 2 Drawing Sheets", insert -- 9 Claims, 1 Drawing Sheet --

$2^{nd}$ page, delete "Sheet 1 of 2", insert -- Sheet 1 of 1 --

$3^{rd}$ page, delete "Sheet 2 of 2 in it's entirety"

Col. 2,
Line 27, delete "darners", insert -- carriers --

Signed and Sealed this

Twenty-second Day of January, 2008

JON W. DUDAS
*Director of the United States Patent and Trademark Office*